(12) United States Patent
Jain et al.

(10) Patent No.: US 8,380,804 B2
(45) Date of Patent: Feb. 19, 2013

(54) IDENTIFYING AND PRESENTING REMINDERS BASED ON OPPORTUNITY FOR INTERACTION

(75) Inventors: Rohit Rocky Jain, Waterloo (CA);
Daniel James Legg, Waterloo (CA);
Jerome Pasquero, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 267 days.

(21) Appl. No.: 12/692,254

(22) Filed: Jan. 22, 2010

(65) Prior Publication Data
US 2011/0185029 A1 Jul. 28, 2011

(51) Int. Cl.
*G06F 15/16* (2006.01)
(52) U.S. Cl. ...................................... 709/207
(58) Field of Classification Search ........... 709/206–207
See application file for complete search history.

(56) References Cited

U.S. PATENT DOCUMENTS

| | | | |
|---|---|---|---|
| 7,212,827 B1 | 5/2007 | Veschl | |
| 7,487,456 B2 | 2/2009 | Brooke | |
| 7,912,480 B2 | 3/2011 | Moosavi et al. | |
| 2004/0162882 A1* | 8/2004 | Mora | 709/207 |
| 2005/0101335 A1 | 5/2005 | Kelly | |
| 2005/0221820 A1 | 10/2005 | Ruetschi | |
| 2005/0273493 A1 | 12/2005 | Buford | |
| 2006/0168054 A1* | 7/2006 | Burkhart et al. | 709/206 |
| 2006/0195518 A1* | 8/2006 | Neilsen | 709/204 |
| 2007/0073810 A1 | 3/2007 | Adams | |
| 2008/0021964 A1* | 1/2008 | Inbarajan | 709/206 |
| 2008/0261633 A1* | 10/2008 | Lazaridis et al. | 455/466 |
| 2008/0301567 A1 | 12/2008 | Martin | |
| 2009/0054091 A1* | 2/2009 | van Wijk et al. | 455/466 |
| 2009/0077188 A1* | 3/2009 | Arneson et al. | 709/206 |
| 2009/0197619 A1 | 8/2009 | Colligan | |
| 2011/0106613 A1* | 5/2011 | Felt et al. | 705/14.46 |
| 2011/0131060 A1* | 6/2011 | Schuster et al. | 705/3 |

OTHER PUBLICATIONS

Andy Konkol, BlueBoss—Bluetooth Proximity Detection, Internet Blog, Jun. 26, 2008, Chicago, IL, USA.
EPO Extended European Search Report; Application No. EP10153286.9; May 19, 2010; 9 pages.
EPO Examiner's Report; Application No. EP10153286.9; Aug. 8, 2011; 4 pages.

* cited by examiner

*Primary Examiner* — Jason Recek
(74) *Attorney, Agent, or Firm* — Rowand LLP

(57) ABSTRACT

A method and apparatus are provided for presenting a reminder for a PIM record when there may be an opportunity for personal interaction regarding the PIM record. The opportunity for personal interaction regarding the PIM record may be identified in response to a trigger condition not associated with the PIM record. In one embodiment, an opportunity for interaction regarding a PIM record may be identified using identification information associated with the trigger condition. In another embodiment, an opportunity for interaction regarding a first PIM record may be identified when there is a contact associated with the first PIM record and a second PIM record, and there is an occurrence of a trigger condition associated with a second PIM record. In some embodiments, the portable electronic device may utilize additional information to identify or verify opportunities for interaction regarding a PIM record.

20 Claims, 12 Drawing Sheets

Prior Art - Figure 1

IDENTIFYING AND PRESENTING REMINDERS BASED ON OPPORTUNITY FOR INTERACTION

FIELD OF TECHNOLOGY

The present disclosure relates to reminders associated with Personal Information Management, "PIM" records on a portable electronic device, and further relates to reminder notifications associated with trigger conditions.

BACKGROUND

Many portable electronic devices (such as cellular telephones, smart telephones, portable computers, portable personal digital assistants, and portable electronic gaming devices) provide access to PIM records, such as calendar events, task items, memos, or other personal information management data records. PIM records may be generated and managed in a variety of ways. For example, PIM records may be managed on another electronic device such as a desktop or personal computer. A synchronization server or centralized storage server may provide synchronization for a plurality of electronic devices. This may provide a convenient solution for a user to access PIM records from a plurality of electronic devices, including a portable electronic device. For example, PIM records may be generated through an input portion of the portable electronic device, generated on a personal computer synchronized with the portable electronic device, generated through a third party service, or automatically generated as a result of processing other PIM records. PIM records accessible to a portable electronic device may be stored in memory of the portable electronic device or in one or more servers accessible by the portable electronic device via a network.

PIM records often have reminders associated with them. A reminder configured in a PIM record may be used to alert the user regarding the PIM record. Existing reminders associated with PIM records include time based reminders and proximity based reminders. The purpose of these reminders is to notify the user regarding the PIM record for which the reminder is configured. Reminders for a PIM record are presented in a number of ways, such as visual, auditory, tactile, or various other sensorial presentations.

FIG. 1 provides examples of PIM records and reminders. In FIG. 1, a portable electronic device 100 has access to a plurality of PIM records, represented by a calendar PIM record 110, a proximity reminder 130, a task PIM record 150, and a generic PIM record 170. In FIG. 1, the PIM records are stored in a local database 102 in the memory of the portable electronic device 100. The portable electronic device 100 in FIG. 1 has a display on which various images, screens or windows may be reproduced. As shown, the portable electronic device 100 may reproduce a first example screen 101a and a second example screen 101b.

A PIM record, such as calendar PIM record 110, may optionally include subject information 111, location data 112, date and time information 113, a time based reminder setting 114, and a list of attendees 115. A PIM record, such as proximity reminder 130, may include reminder text 131 and an identifier 132 of another portable electronic device. A PIM record, such as task PIM record 150, may optionally include a subject 151, status setting 152 of the task, a completion deadline 153, a time based reminder setting 154. Similar to task PIM record 150, a PIM record may also include a setting for linked persons 155. The setting for linked persons 155 may include, for example, a name of a person, a computer identifier associated with a contact PIM record for a person, a setting for delegating a portion of the task PIM record 150 responsibilities to another person, or any other information which might identify a contact associated with the task PIM record 150. Generic PIM record 170 is representative of other PIM records which might be generated, accessible or otherwise used by a portable electronic device. Generic PIM record 170 may include information elements 171 which may be associated with contact information, task information, event information, email information parts, memo information, or any other information which may be associated with Personal Information Management, PIM, records. It should be understood that calendar PIM record 110, proximity reminder 130, task PIM record 150, or any other PIM record described in this disclosure may be configured in various ways by combining or otherwise organizing the constituent information differently. Furthermore, PIM records may include additional information elements which are not explicitly described nor shown in FIG. 1.

In the first example screen 101a, a time based reminder 120 is displayed. In this example, the current time 105 is 2:45 pm. The time based reminder setting (e.g., setting 114 associated with calendar PIM record 110) in this example is configured to reminder the user regarding the calendar PIM record 110 approximately 15 minutes before the event, as determined by the date and time information 113. At 2:45 PM, because of the configured time based reminder setting 114, the example screen 101a is presenting the time based reminder 120, including event information 125 which is extracted from various information elements in the calendar PIM record 110.

In another example depicted in FIG. 1, a proximity based reminder 140 appears on example screen 101b of a portable electronic device 100. In this example, the portable electronic device may monitor (e.g., periodically, randomly, at regular intervals, etc.) for a radio frequency broadcast signal, such as Bluetooth™. Upon detection of a signal from a second portable electronic device, the portable electronic device may compare an identification or signature, carried in the signal from the second portable electronic device, to a proximity reminder 130 configured with an identifier 132 of the second portable electronic device. The proximity based reminder 140 may comprise reminder information 145 extracted from a proximity reminder 130 configured in the portable electronic device.

So long as the foregoing-described existing reminders are established, they are useful for their intended purpose. However, in the absence of reminders associated with PIM records, it may be difficult to identify opportunities to act on stored PIM records.

BRIEF DESCRIPTION OF THE DRAWINGS

The disclosure refers to the following figures, in which like numerals describe substantially similar components throughout the several views.

DETAILED DESCRIPTION

The present disclosure provides a method and apparatus for presenting a reminder for a PIM record when there may be an opportunity for personal interaction regarding the PIM record. The opportunity for personal interaction regarding the PIM record may be identified in response to a trigger condition that is not associated with the PIM record.

In this disclosure, a trigger condition may be any stimulation, event, trigger, or condition of a portable electronic device which initiates a process in the portable electronic device, and which may be used to obtain identification information associated with the trigger condition. A trigger condition often occurs when there is an opportunity for interaction. By obtaining identification information associated with the trigger condition, a portable electronic device may identify opportunities regarding PIM records that might coincide with the opportunity for interaction associated with the trigger condition. Identification information may comprise a name, an email address, a user name, a phone number, location information about a contact, schedule information about a contact, or any other information which might be associated with a contact. A contact does not necessarily require an associated contact PIM record, but may also refer to a person, individual, group, association, place, resource provider, or other contact descriptor regardless of whether it is associated with a contact PIM record.

In one embodiment, an opportunity for interaction regarding a PIM record may be identified using identification information associated with a trigger condition. In another embodiment, an opportunity for interaction regarding a first PIM record may be identified when there is a contact associated with the first PIM record and a second PIM record, and there exists a trigger condition associated with a second PIM record. In some embodiments, a portable electronic device may utilize additional information to identify opportunities for interaction regarding a PIM record. Additional information may also be used to qualify or confirm an opportunity for interaction regarding a PIM record. For example, a portable electronic device may obtain status information regarding a contact before presenting a reminder regarding a PIM record if the status information suggests there is not an opportunity for interaction regarding the PIM record.

Figure 1:
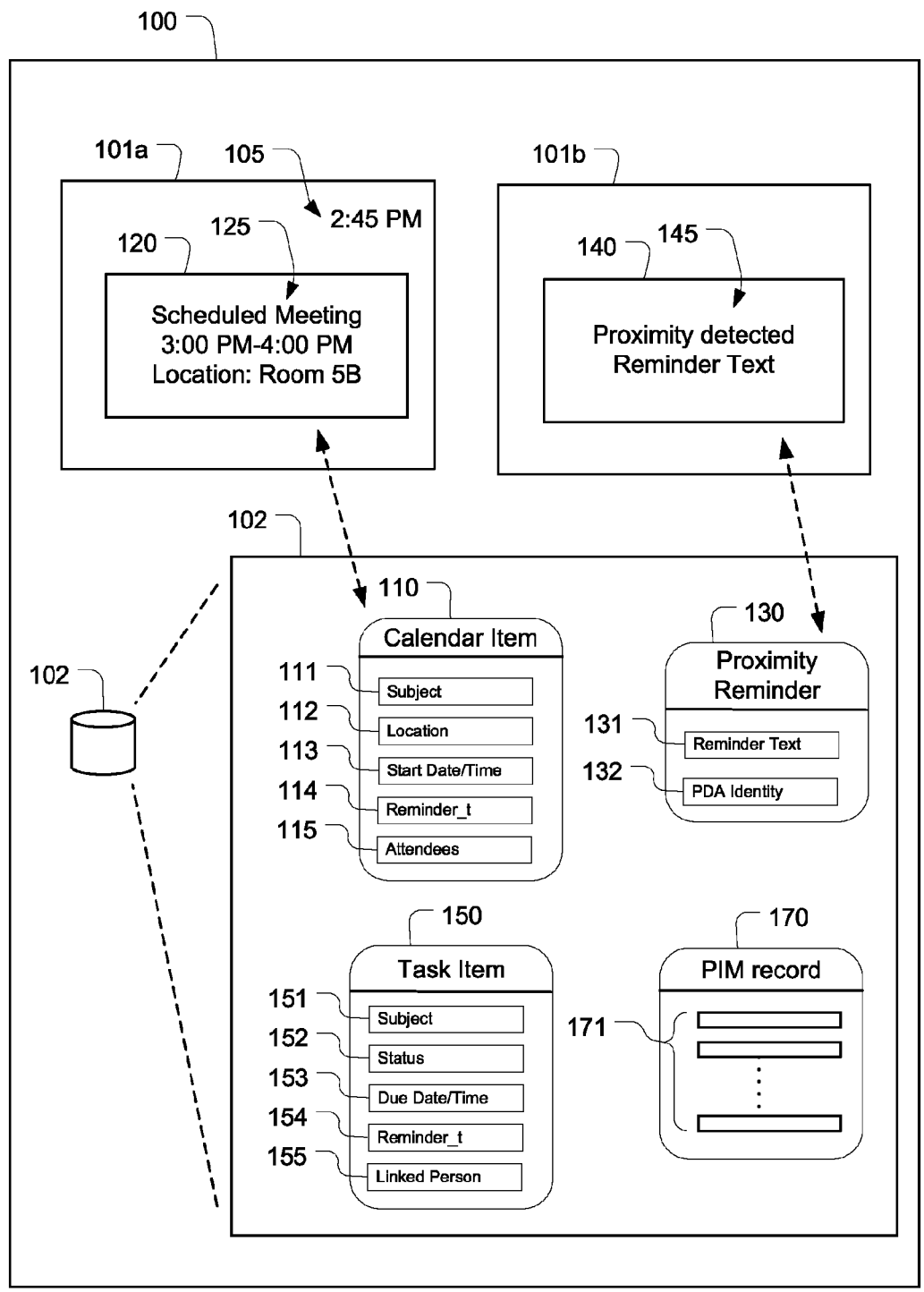
FIG. 1 is a diagram illustrating examples of reminders and PIM records.

Referring now to FIG. 1, an illustrative scenario is provided to describe the notion of an opportunity-based reminder. In the illustrative scenario, David is a user of the portable electronic device 100 having access to a plurality of PIM records, including calendar PIM record 110 and task PIM record 150.

David has a task represented by the task PIM record 150, and David knows that completion or progress of the task may depend on some action or information which John is to perform or provide. Therefore, David has designated John as a linked person in the setting for linked persons 155 in David's task PIM record 150. David intends to speak with John regarding the task PIM record 150 at the next opportunity. However, David has not scheduled any proximity alert or time based reminder associated with task PIM record 150 for any number of reasons including: the task has no set deadline; David does not know when he will be able to confer with John (based on David's or John's availability); and the like. Accordingly to ensure that David confers with John regarding the task, David would have to rely on his memory or otherwise check his task list periodically or regularly. However, despite reliance on memory or checking his task list, it is still possible for David to miss an opportunity to confer with John regarding the task.

One specific missed opportunity scenario is now described with respect to the foregoing David and John scenario. Similar to the description of example screen 101a, David's portable electronic device 100 presents a time based reminder 120 associated with an event such as a face to face meeting or teleconference approximately 15 minutes prior to the event described in David's calendar PIM record 110. In this example, David's calendar PIM record 110 includes a list of attendees 115, one of the persons listed in the list of attendees 115 is one of David's contacts, John. David and John both attend the event. However, David forgets to check his list of task items, including task PIM record 150. Furthermore, David is distracted by the activity leading up to and during the event and, therefore, completely forgets to speak with John regarding the task PIM record 150. David has missed an opportunity to interact with John regarding the task PIM record 150 because he did not receive an opportunity based reminder that identified an association between calendar PIM record 110 and task PIM record 150.

Figure 2:
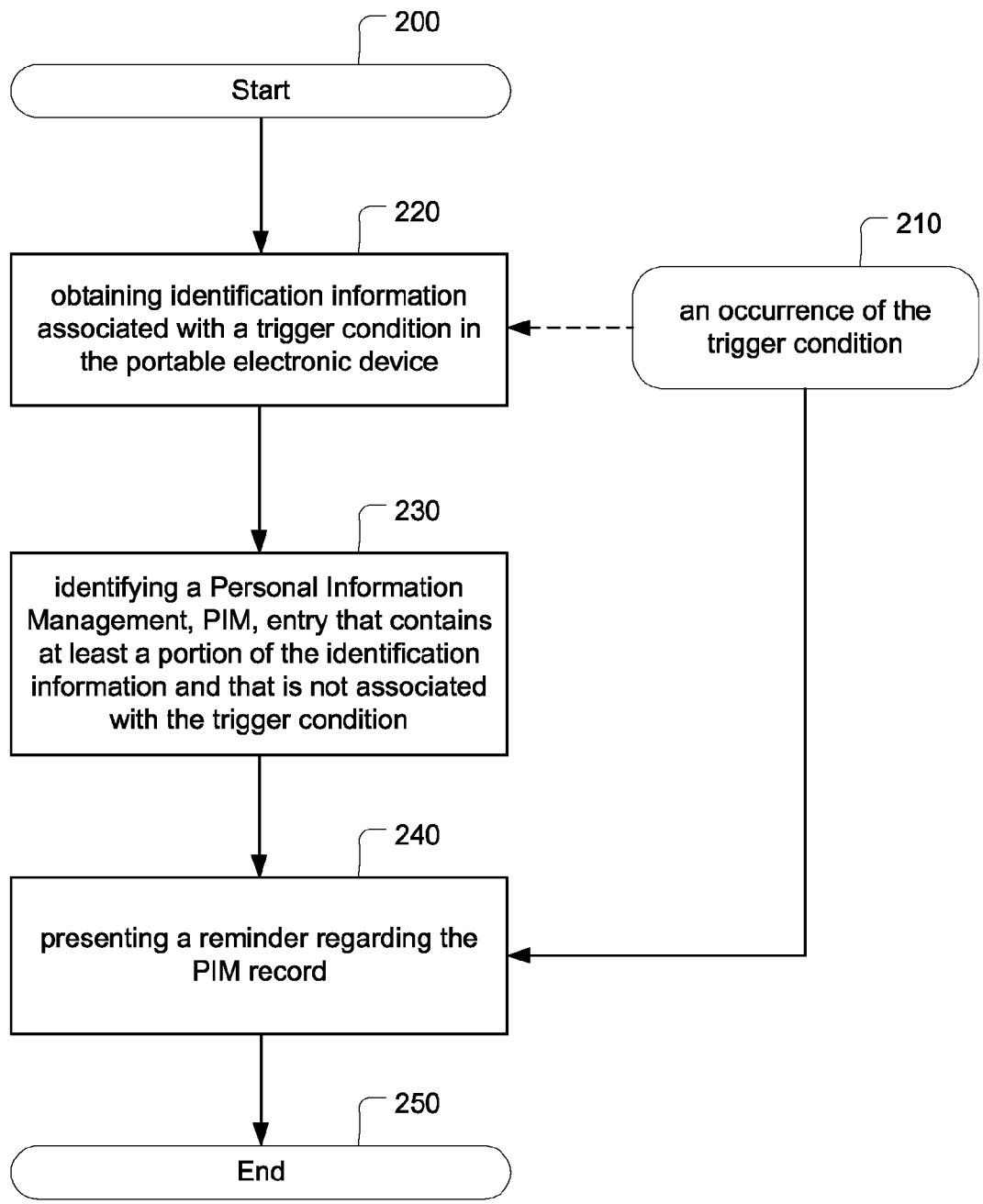
FIG. 2 is a flowchart illustrating a method of presenting a reminder based upon identification information associated with a trigger condition in accordance with an embodiment of the present disclosure.

FIG. 2 illustrates a method of presenting an opportunity-based reminder in accordance with at least one of the embodiments described in the present disclosure. In FIG. 2, an example reminder method starts at block 200. At some point, there is an occurrence of a trigger condition as illustrated by block 210. In one embodiment, the method step described in block 220 of FIG. 2 occurs after the occurrence of the trigger condition. In other embodiments, several of the method steps may occur prior to the trigger condition, such as when the trigger condition is a time based reminder that will occur at a predetermined time in the future.

There are several trigger conditions described in this disclosure, but it should be understood that the specific examples described in this disclosure are not an exhaustive list of trigger conditions which might be used in accordance with this disclosure. A trigger condition may be any stimulation, event, trigger, or condition of a portable electronic device which initiates a process in the portable electronic device, and which may be used to obtain identification information associated with the trigger condition. Some examples of trigger conditions include an incoming call, a time based reminder associated with a second PIM record, the beginning or end of a call, a proximity detection to an identified device, an incoming or outgoing message (such as email, instant message, or short message service messages), or any other condition of a portable electronic device which may be used to obtain associated identification information associated with the trigger condition.

Describing a first embodiment, there is an occurrence of a trigger condition at block 210. In block 220, the portable electronic device obtains identification information associated with the trigger condition. Identification information may comprise a name, an email address, a user name, a phone number, location information about a contact, schedule information about a contact, or any other information which might be used to identify at least one contact. The identification information may comprise information that identifies more than one contact, such as example of several people listed as attendees in a calendar PIM record triggered by a time based reminder. The type of identification information obtained based on the trigger condition may depend on the type of trigger condition.

As there are several trigger conditions described in this disclosure, this disclosure provides several examples of obtaining identification information as shown in block 220. For some trigger conditions, the trigger condition will include the identification information and the identification information may be extracted directly from trigger information included in the trigger condition (for example, a caller's phone number included in an incoming call, source email address for an incoming message, personal identification number for an incoming message, etc). In other embodiments, the identification information is obtained by processing trigger information associated with the trigger condition. The trigger information may be used in a database query (also referred to as a "lookup"), a local database query, a remote database query, a query to a service provider, or otherwise translated from trigger information to identification information. In some embodiments, the trigger information may be translated to identification information through the use of social network applications, information service providers, or information embedded in documents associated with the trigger condition.

In one example, a trigger condition may be a reminder associated with a second PIM record. This might include a time-based reminder which is associated with a calendar event described in the second PIM record. A trigger condition may also comprise the scheduled starting or ending time of a calendar event described in the second PIM record. In the second PIM record there may be a list of attendees, the list of attendees including identification information associated with at least one contact associated with the second PIM record.

In another example, a trigger condition may be an incoming call which provides caller identification information, such as a calling number. The calling number may be used to obtain further identification information, such as an associated contact PIM record, identification information from a reverse call lookup service, or identification information from a third party service which may associate a contact to the calling number.

A trigger condition may be an incoming message (such as an email, instant message, text message, or multimedia message). The incoming message may comprise an email address, name, username, or other identification information. If the incoming message comprises an IP address, it may be possible to obtain identification information associated with a contact by performing a lookup in a remote database that associates IP addresses to device owners. Alternatively, the incoming message might comprise a personal identification number which represents the sender and can be used to obtain identification information about the sender.

In a further example, a trigger condition could be a notification message to a first portable electronic device from a location service, the notification message indicative that the location service has identified a second portable electronic device within a preconfigured proximity to the first portable electronic device, and including identification information associated with the user of the second portable electronic device. Alternatively, a trigger condition may be a detection of a nearby device based on received short range radio frequency broadcasts from the nearby device, the short range radio frequency broadcast including information which may be used to identify the device or the user of the device.

Obtaining identification information, as shown in block 220, may also involve iterative processing of trigger information. For example, trigger information may be processed to obtain other information, and the other information may be further processed to obtain identification information. For example, obtaining identification information may comprise obtaining other information from a second PIM record that contains at least a portion of the identification information and that is not associated with the trigger condition, and using the other information as identification information. Processing of trigger information (or the other information) may involve several operations of database queries, reverse lookups, or merging of other information to obtain identification information associated with the trigger condition.

In block 230, the portable electronic device identifies a PIM record that contains at least a portion of the identification information and that is not associated with the trigger condition. For example, if the trigger condition is a time based reminder relative to a calendar PIM record, that calendar PIM record will not be identified in block 230. In another example, the trigger condition may be a proximity alert relative to a proximity reminder PIM record, where the identifying as shown in block 230 will not include that proximity reminder PIM record in the results of identified PIM records that contain at least a portion of the identification information and that is not associated with the trigger condition. In some situations the identified PIM record is associated with a first topic and a second PIM record which is associated with the trigger condition may be associated with a second topic, the second topic unrelated to the first topic. The identifying shown in block 230 may be performed in a number of ways known to a person of skill in the art, such as searching a database of PIM records, querying a server that provides a list of identified PIM records, or comparing specific fields of PIM records with the portion of the identification information. In block 230, the portable electronic device identifies at least one PIM record that matches the criteria of containing at least a portion of the identification information and that is not associated with the trigger condition.

With respect to the foregoing-described David and John missed opportunity scenario, trigger condition (block 210) may be the time based reminder 120 presented to David. Obtaining identification information (block 220) may comprise scanning the calendar PIM record 110 associated with the time based reminder 120 for participant information. The calendar PIM record 110 includes the list of attendees 115, which has identification information that identifies John. The identifying operation (block 230) may be searching for other PIM records (e.g., tasks, memos, etc.) that are associated with John and are not associated with the time based reminder 110, and identifying task PIM record 150.

In block 240, the portable electronic device presents a reminder regarding the PIM record identified in block 230, upon an occurrence of the trigger condition (block 210). Because the trigger condition represents a current condition on the portable electronic device, the identification information associated with the trigger condition suggests that there may be an opportunity to interact with the contact represented by the identification information. By presenting a reminder for a PIM record that contains at least a portion of the identification information, the portable electronic device has presented an opportunity based reminder for the PIM record that might not otherwise triggered by the trigger condition. As can be appreciated, this opportunity based reminder may facilitate or enable an interaction or completion of a task related to the PIM record that does not have any reminder configured prior to the occurrence of the trigger condition.

When presenting a reminder regarding the PIM record, the portable electronic device may also present additional information from the PIM record which enables a user of the portable electronic device to efficiently use the opportunity to interact with the contact associated with the PIM record. For example, the portable electronic device may present related PIM records, files, notes, or information retrieved from server via a network.

Various known techniques for prioritizing reminders in the portable electronic device may be used with this disclosure. For example, a priority setting, date of creating, or due date associated with the PIM record may be used when determining which opportunity based reminder(s) or how many opportunity based reminders to present.

In addition to known techniques for prioritizing reminders, this disclosure includes a new technique in relation to opportunity based reminders. The portable electronic device may prioritize the presentation of PIM records based on frequency of opportunity to interact regarding each of the PIM records. The portable electronic device may store in the memory of the device, opportunity frequency information associated with each PIM record. In a situation when the identifying operation (block 230 of FIG. 2) identifies more than one PIM record that contains the portion of the identification information and that is not associated with the trigger condition, then the identified PIM records may be prioritized based on the opportunity frequency information associated with each of the identified PIM records.

Describing a second embodiment with respect to FIG. 2, the example method begins at block 200. In this embodiment, the trigger condition may be a time based reminder that will occur at a predetermined time in the future. For example, there may be a scheduled PIM record (such as a calendar PIM record) that has a configured time based reminder setting that will trigger the scheduled time based reminder in the future. The portable electronic device may periodically check for scheduled time based reminders and treat each scheduled time based reminder as a predicted trigger condition for preparing opportunity based reminders in advance of an occurrence of the predicted trigger condition 210. The scheduled PIM record that contains the scheduled time based reminder may have identification information included in the scheduled PIM record. In step 220, the portable electronic device obtains the identification information associated with the scheduled PIM record. In step 230, the portable electronic device having access to PIM records, identifies a PIM record that contains a portion of the identification information and that is not associated with the scheduled PIM record. In this second embodiment, the portable electronic device may store information about predicted opportunity based reminders in a memory of the portable electronic device. For example, this may be stored as a separate reminder, as a new association in the scheduled PIM record, or as a modification to the PIM record identified in step 230. Upon occurrence of the predicted trigger condition 210 (such as occurrence the scheduled time based reminder at the scheduled time), the portable electronic device presents a reminder regarding the PIM record 240.

Figure 3:
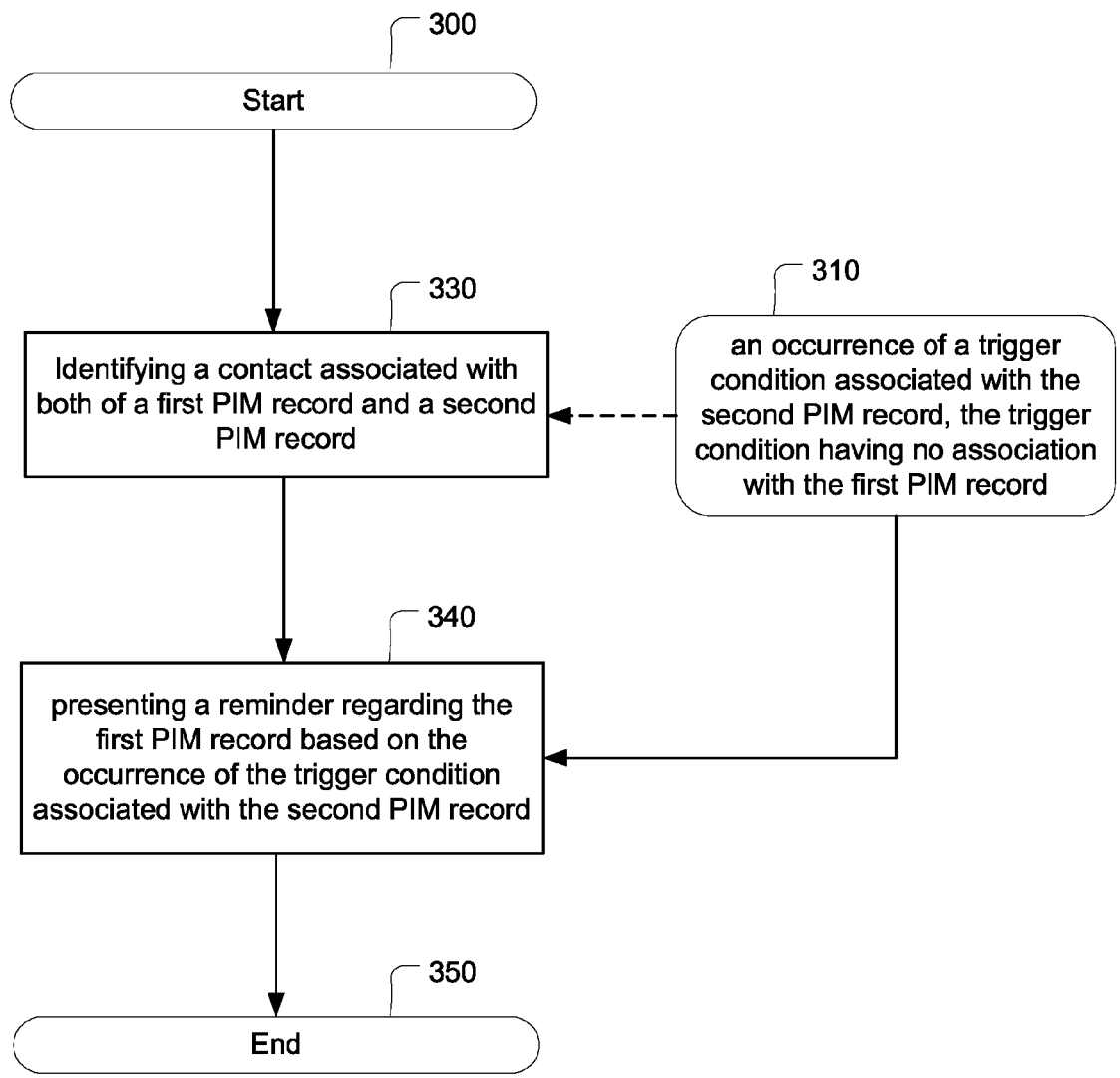
FIG. 3 is a flowchart illustrating a method of presenting a reminder for a first PIM record upon an occurrence of a trigger condition associated with a second PIM record in accordance with another embodiment of the present disclosure.

FIG. 3 illustrates another example method of presenting an opportunity-based reminder involving a first PIM record and a second PIM record, starting with block 300.

At block 330, the portable electronic device identifies that there is a contact associated with both of a first PIM record and the second PIM record. The identifying operation, as described in block 330, may occur either before or after the occurrence of the trigger condition (block 310) associated with the second PIM record. At block 310 there is an occurrence of a trigger condition at block 210. Similar to FIG. 2, the trigger condition may be a variety of trigger conditions. However, as depicted in block 310, the trigger condition in FIG. 3 is associated with a second PIM record. For example, the trigger condition may be a time based reminder, a proximity reminder, or any other trigger condition associated with the second PIM record. By analyzing PIM records to identify when a contact is associated with two or more PIM records, the portable electronic device may generate an opportunity based reminders for a first PIM record that may be seemingly unrelated to a trigger condition in a second PIM record. At block 340, the method includes presenting a reminder regarding the first PIM record based on the occurrence of the trigger condition associated with the second PIM record, the trigger condition having no association with the first PIM record.

Figure 4:
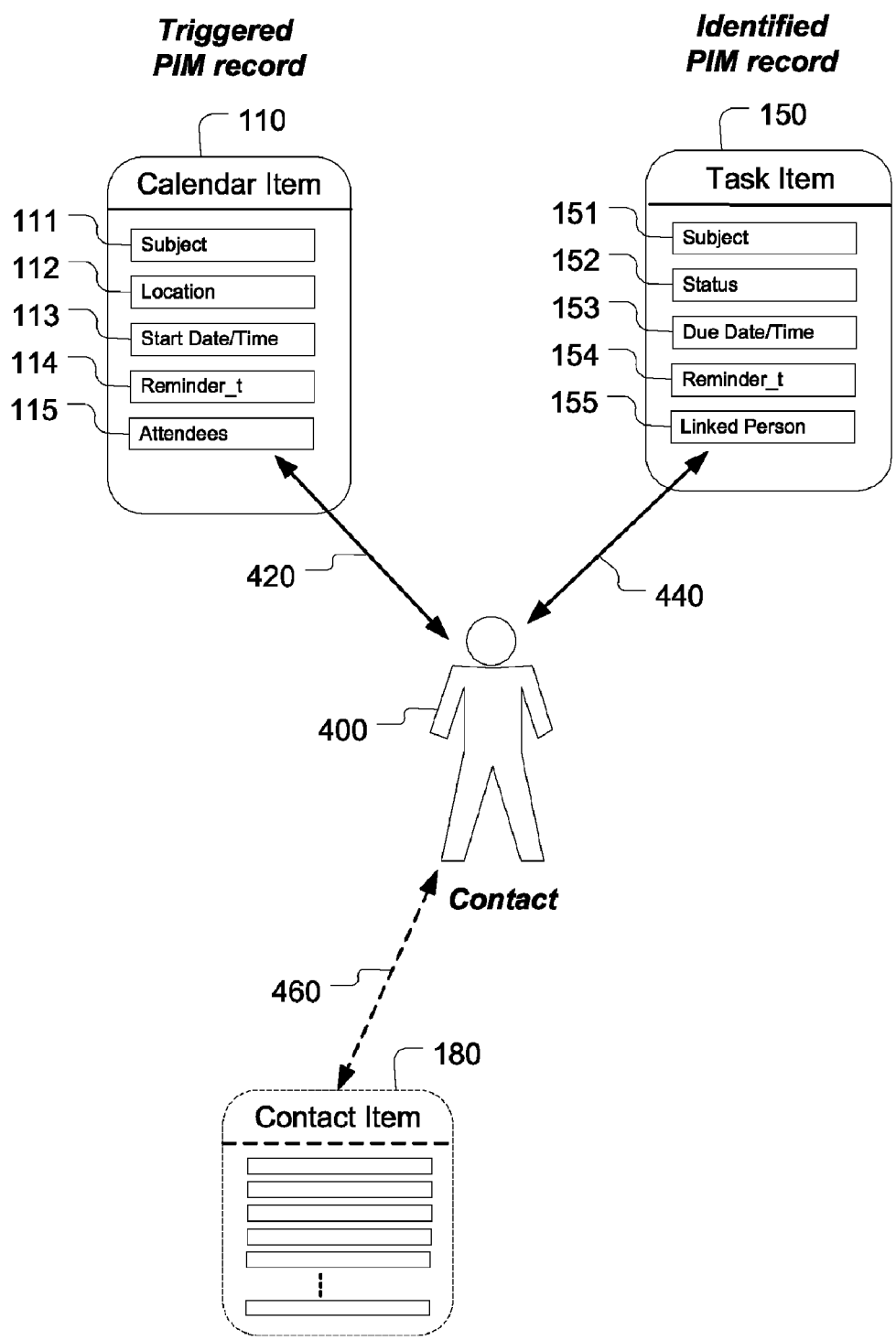
FIG. 4 is a diagram illustrating an example method of presenting a reminder by associating a first PIM record to a trigger condition of a second PIM record.

FIG. 4 depicts an example implementation in accordance with at least one of the embodiments described in the present disclosure. Continuing with the example in FIG. 1, the same scenario may be improved using one or more of the techniques described in this disclosure. User, David, carries a portable electronic device having access to PIM records, including calendar PIM record 110 and task PIM record 150. In this example, calendar PIM record 110 may represent a scheduled conference call, and includes a time based reminder setting 114. A trigger condition occurs when the time based reminder associated with the time based reminder setting 114 is presented to David by David's portable electronic device. David's portable electronic device obtains identification information (from the list of attendees 115 in calendar PIM record 110) associated with the trigger condition (time based reminder for calendar PIM record 110). As described before, the list of attendees 115 includes identification information identifying (illustrated by double-headed arrow 420) contact, John, as an attendee of the conference call. Contact John may be represented by contact 400 in FIG. 4. Contact 400 is not necessarily associated with contact PIM record 180, but may also refer to a person, individual, group, association, place, resource provider, or other contact descriptor regardless of whether it is associated with a contact PIM record 180. David's portable electronic device identifies (illustrated by double-headed arrow 440) a PIM record, represented by task PIM record 150, that contains a portion of the identification information. In FIG. 4, task PIM record 150 includes a setting for linked persons 155, which includes John's name as a linked person. Upon occurrence of the trigger condition associated with the triggered PIM record, the portable electronic device presents a reminder associated with the identified PIM record. In the example, David's portable electronic device may present a 15 minute reminder of a meeting about to begin, as well as a reminder regarding task PIM record 150, where David might have an opportunity to work on the task with John prior to the meeting. Alternatively, the trigger condition may be the ending time of the triggered PIM meeting, so that David is presented with a reminder regarding task PIM record 150 at the conclusion of the meeting where John and David are both attendees.

In further scenarios, task PIM record 150 may be a task for David to discuss a document with John. In this scenario, when the portable electronic device presents the reminder to David regarding the task PIM record 150, the reminder may include a link to the document, a summary of the contents of the document, or a portion of the document that needs to be discussed. Alternatively, the reminder may include (as illustrated by double-headed arrow 460) information regarding the contact 400, stored in a contact PIM record 180. For example, David's portable electronic device may present a reminder regarding task PIM record 150 and include a phone number for John stored in contact PIM record 180 so that David can call John prior to or after the meeting.

If David's portable electronic device identifies several PIM records which contain a portion of the identification information included in the triggered PIM record, then David's device might prioritize the presentation of the identified PIM records. For example, David sees John very frequently, so the portable electronic device may prioritize the opportunity based reminder associated with task PIM record 150 lower than an opportunity based reminder associated with another identified PIM record for a contact which David rarely has an opportunity with which to interact.

Finally, David's portable electronic device may implement procedures or operations described above with respect to FIG. 10 for presentation of the opportunity based reminder. David's portable electronic device may obtain proximity information associated with John, such as detecting for a short range radio frequency broadcast from a second portable electronic device belonging to John. David's device determines attendance verification for John based on whether John's device is within a short range proximity to David. If the attendance verification indicates that John is present at the meeting (first condition), then David's device might present the reminder regarding the task PIM record 150. If the attendance verification indicates that John is not present at the meeting (second condition), then David's device might refrain from presenting the reminder 350.

Figure 5:
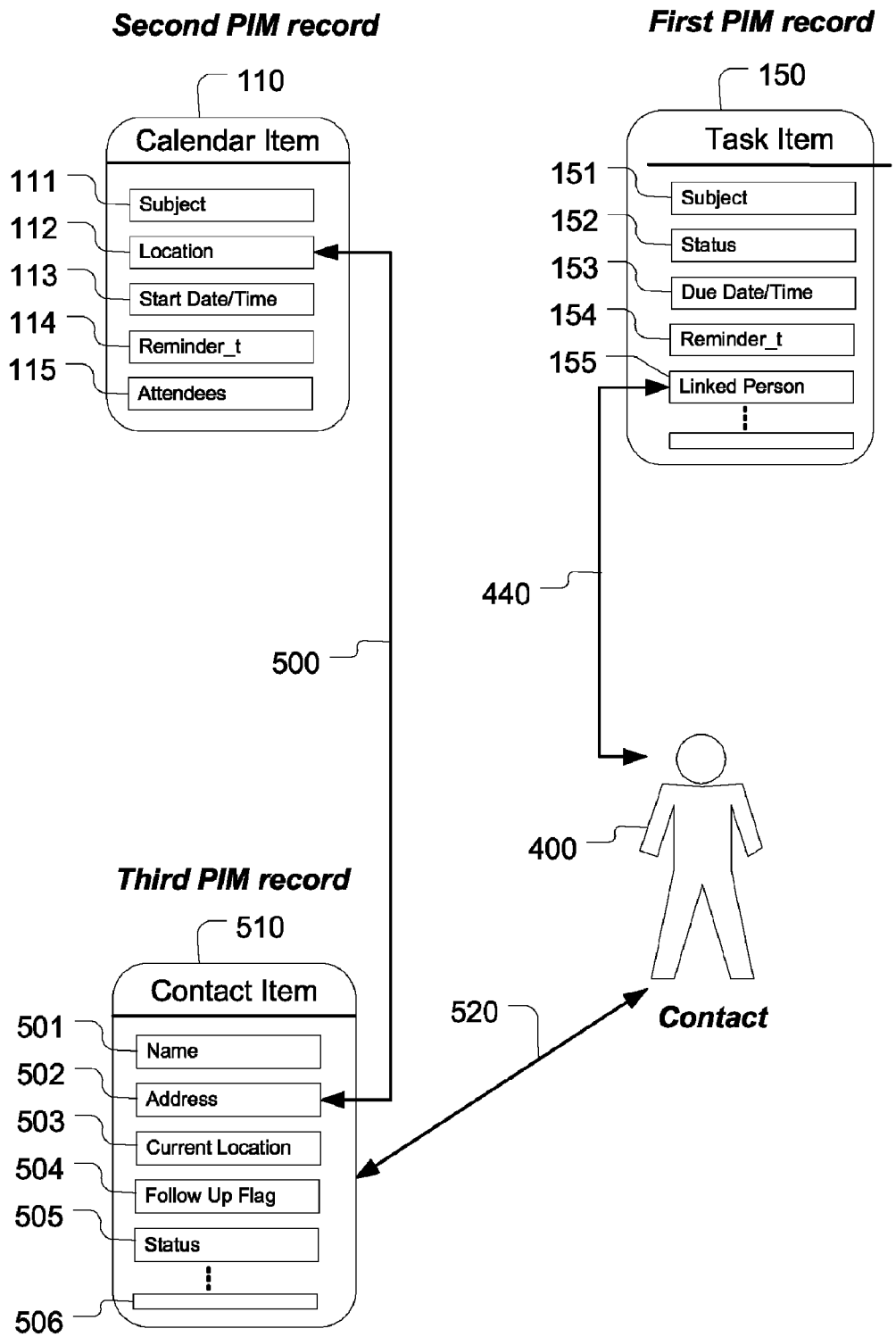
FIG. 5 is a diagram illustrating an example method of presenting a reminder using a third PIM record to establish a relationship between a first PIM record and a second PIM record.

FIG. 5 is a diagram illustrating an example scenario in which first, second and third PIM records are used in associating a first PIM record to a trigger condition of a second PIM record in accordance with at least one of embodiments described in the present disclosure. A user of a portable electronic device has access to PIM records, including a first PIM record, a second PIM record, and a third PIM record. In this figure, the second PIM record may be the cause for a trigger condition in the portable electronic device. The portable electronic device may obtain identification information associated with the trigger condition by determining a relationship between a contact and the second PIM record based on other information. In this figure, the portable electronic device determines a relationship between the second PIM record and the contact based upon a third PIM record.

In FIG. 5, the first PIM record is represented by task PIM record 150, the second PIM record is represented by calendar PIM record 110, and the third PIM record is represented by contact PIM record 510. The calendar PIM record 110 includes a location data 112 for the meeting represented by the calendar PIM record 110. The location data 112 may be a room number, a building identifier, a street address, a longitude/latitude, a user-entered location tag, or any other information which identifies a location. For example, the location data 112 might reference a building number, such as "Building 2." The contact PIM record 510 describes contact 400, and includes information that may be associated with a contact PIM record, including a name entry 501, address entry 502, current location entry 503, follow-up flag 504, status information 505, or other information elements represented by information element 506. Current location 503 may be a published location (e.g., maintained by a location server), which is logically integrated with contact PIM record 510. For this example, the address entry 502 includes an indication that contact 400 has his office in "Building 2, room 100." The portable electronic device determines a relationship between seemingly unrelated PIM records 110 and 150 through the contact 400 by using a relationship 500 between location data 112 and address entry 502. Address entry 502 is part of the contact PIM record 520 that describes contact 400, and includes identification information, such as a name entry 501. By determining the relationship between the second PIM record and the contact using a third PIM record, the portable electronic device obtains identification information identifying contact 400. In FIG. 5, contact 400 is listed 440 as a linked person in a linked person setting 155 for task PIM record 150. The portable electronic device identifies task PIM record 150 as a PIM record that contains a portion of identification information associated (by way of a third PIM record) with a trigger condition in the second PIM record.

For example the user of the portable electronic device in FIG. 5 may have a meeting in which he will travel to Building 2. The user rarely goes to Building 2, so it is useful that his portable electronic device identifies that he may have an opportunity to meet with contact 400 regarding a task PIM record 150 that is not associated with the meeting described in calendar PIM record 110.

In further examples, the portable electronic device may obtain map and routing information showing the route that the user of the portable electronic device may drive or otherwise traverse to get to the location specified for the second PIM record. If the portable electronic device determines that the portable electronic device will be conveyed past a location associated with a contact, the portable electronic device may utilize identification information associated with the contact to identify PIM records that contain the identification information. There may be an opportunity for the user of the portable electronic device to interact with a contact on a travel route to a location associated with a trigger condition. Further variations might include building floor maps, employee office locations relative to meeting rooms, or location tracking systems that maintain location information for a contact.

Figure 6:
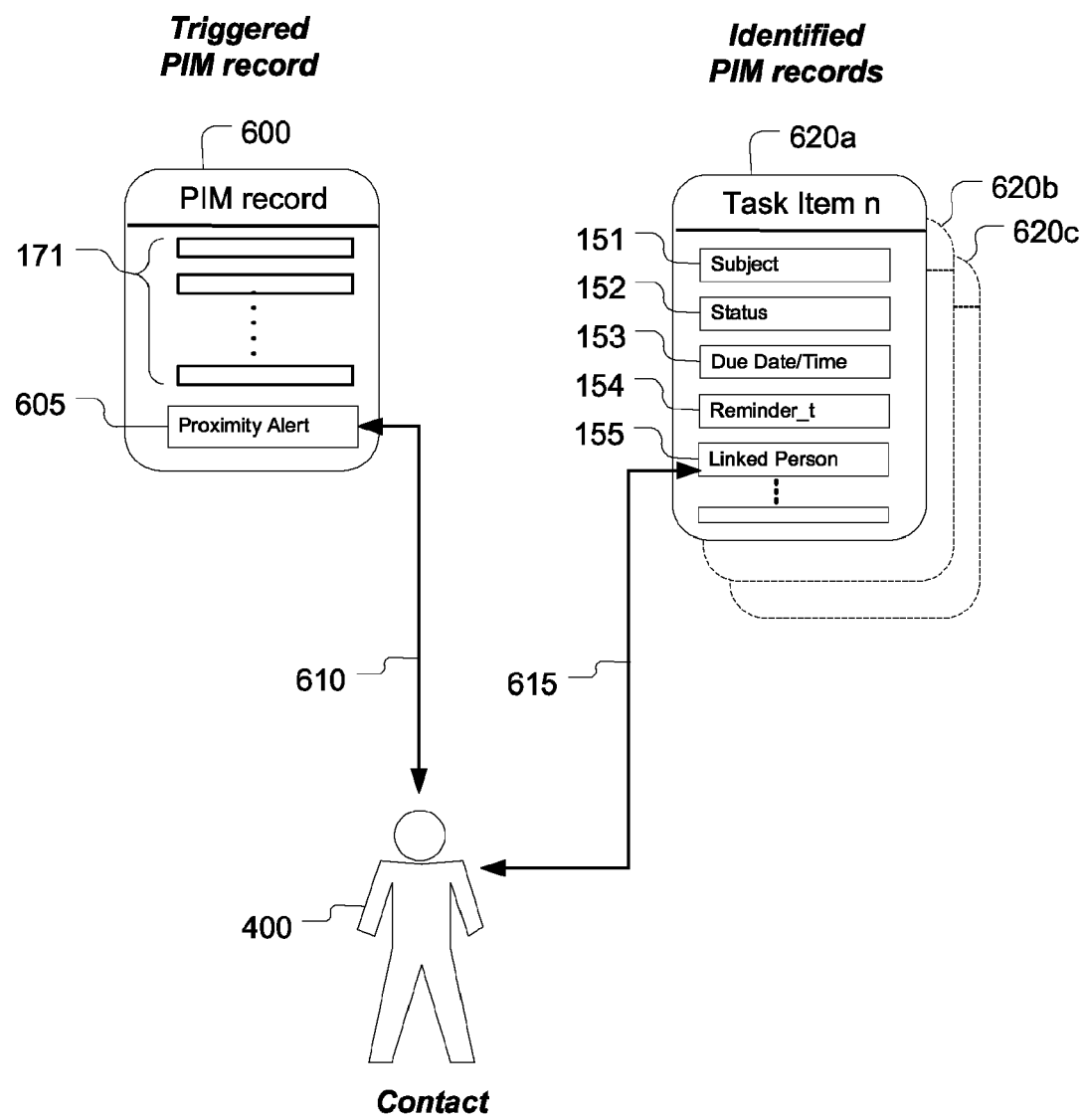
FIG. 6 is a diagram illustrating an example reminder for several identified PIM records based on a trigger condition.

FIG. 6 illustrates an example embodiment in which a trigger condition might be used to identify several PIM records in accordance with at least one of the embodiments described in the present disclosure. In FIG. 6, triggered PIM record 600 is a generic PIM record that includes information elements 171 and a configured proximity alert 605. The configured proximity alert 605 might be a trigger condition that occurs whenever the portable electronic device is within a proximity to a location or another device. For example, when the portable electronic device detects a short range radio frequency broadcast signal identifying a device, it might cause a trigger condition in the triggered PIM record 600. The triggered PIM record 600 may include a relationship 610 to a contact 400. For example, if triggered PIM record 600 is a contact PIM record, it may include identification information in the triggered PIM record 600. In other cases, the triggered PIM record 600 may be a proximity PIM record, a task PIM record defining one task, or any other type of PIM record. If the triggered PIM record 600 does not include identification information in the triggered PIM record 600, the portable electronic device may obtain identification information from a relationship with other information (e.g., through a look up operation that is performed relative to a database or service provider). For example, the portable electronic device may detect a new short range radio frequency broadcast signal that includes a device identification, but does not identify a contact associated with the device identification. The portable electronic device may perform a remote database lookup or query a service provider to obtain identification information associated with the device identification. By determining a relationship 610 between the triggered PIM record and the contact 400, the portable electronic device obtains identification information which may be used to identify PIM records that contain 615 the identification information. In FIG. 6, the portable electronic device has identified three identified PIM records, represented by identified PIM record 620*a*, identified PIM record 620*b*, and identified PIM record 620*c*.

Therefore, when the trigger condition occurs relative to the triggered PIM record 600, the portable electronic device presents reminders associated with identified PIM records 620*a*, 620*b*, 620*c*. It is possible for the user of the portable electronic device to maximize productivity by being reminded regarding various PIM records for which he or she is likely to have an opportunity to complete.

Figure 7:
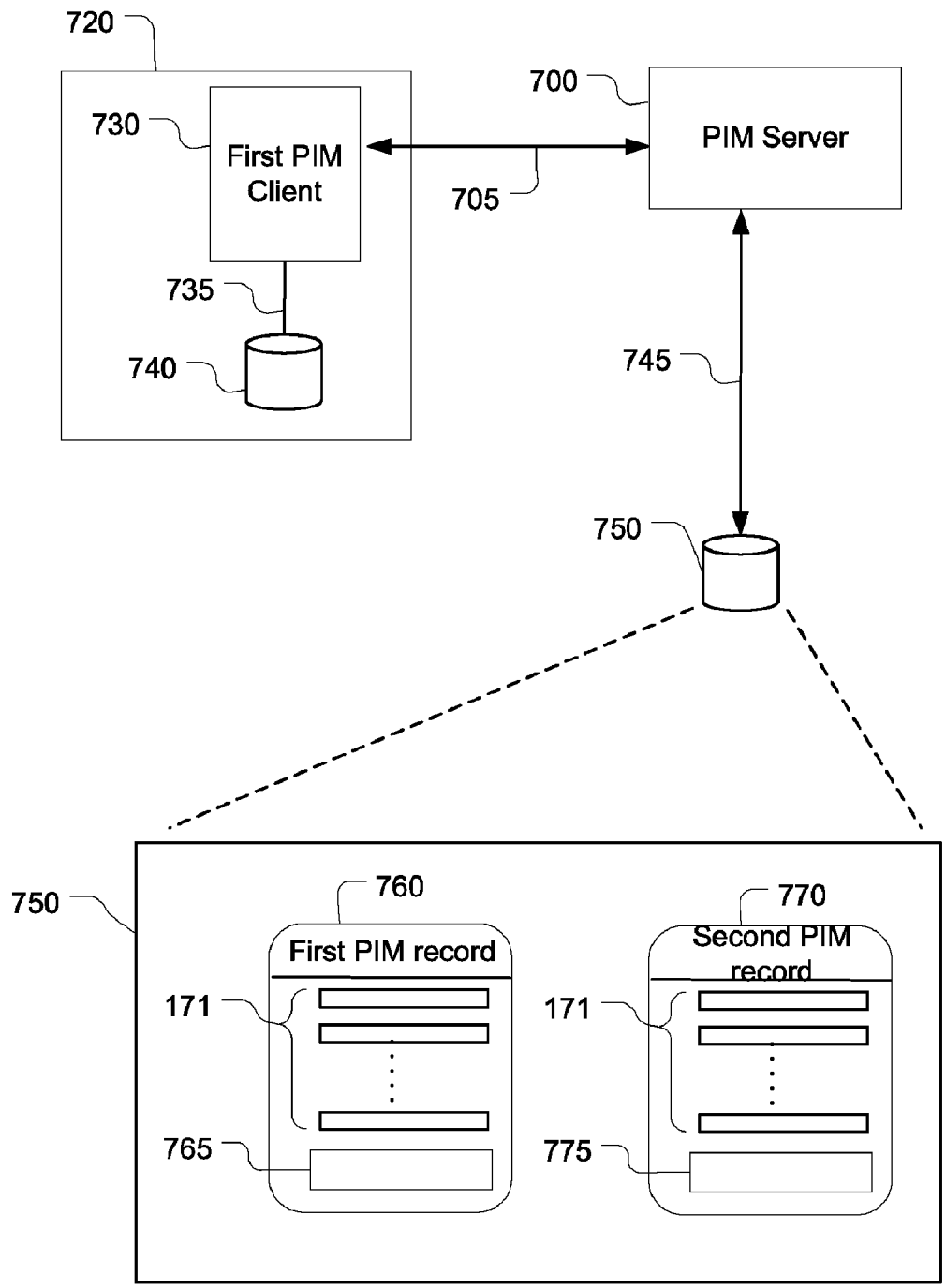
FIG. 7 is a diagram illustrating a PIM server operable to identify PIM records for opportunity based reminders.

FIG. 7 depicts an example configuration wherein a system is operable to match or otherwise associate PIM records for a plurality of portable electronic devices in accordance with at least one of the embodiments described in the present disclosure.

A first portable electronic device 720 comprises a first PIM client 730 that communicates 705 with a PIM server 700 via a network. The first portable electronic device 730 comprises a first local database 740 stored in the memory of the first portable electronic device 730 and accessible 735 by the first PIM client 730. The first portable electronic device 730 may communicate 705 with the PIM server 700 to synchronize the first local database 740 with a first remote database 750. During synchronization, the PIM server 700 and the first PIM client 730 access the first remote database 750 and first local database 740, respectively, to synchronize PIM records. As a result of synchronization, the first remote database 750 includes PIM records associated with the first portable electronic device 720, the PIM records represented by first PIM record 760 and second PIM record 770.

The PIM server 700 may be configured as a computing device (e.g., server hardware) that comprises a processor configured to perform operations similar to those described with reference to FIGS. 2 and 3. The PIM server 700 may analyze a plurality of PIM records to generate a list of predicted trigger conditions expected to occur on the first portable electronic device 720. For example, the second PIM record 770 may include information elements 171 and may include a time-based entry 775 which suggests there will be a trigger condition occurring at the time specified by the time-based entry 775. Time-based entry 775 may be a starting date and time for a meeting, an ending date and time for a meeting, a time based reminder setting, or any other information which indicates a time occurring in the future and associating a trigger condition with the second PIM record 770. Once the PIM server 700 has generated a list of predicted trigger conditions, for each predicted trigger condition, the PIM server 700 may obtain identification information associated with the predicted trigger condition. Using the identification information, the PIM server 700 may identify a PIM record that contains at least a portion of the identification information and that is not associated with the predicted trigger condition. For example, the PIM server 700 may identify the first PIM record 760 as containing identification information in a linked person setting 765 in the first PIM record 760. After identifying the first PIM record 760, the PIM server 700 may send present a reminder notification regarding the first PIM record 760 to the first portable electronic device 720 based on the predicted trigger condition. The reminder notification may be a message communicated to the first portable electronic device 720. The reminder notification may create a new reminder entry in the first portable electronic device 720 if the reminder notification is sent prior to the occurrence of the predicted trigger condition. The new reminder entry may be a reminder that is presented to the user of the first portable electronic device 720 upon occurrence of the predicted trigger condition. Alternatively, the PIM server 700 may communicate a message to the first portable electronic device 720 at the time when the predicted trigger condition is expected to occur. A system implemented in this way may be useful, for example, if database queries are used to determine relationships between predicted trigger conditions and identification information. To this end, the PIM server 700 performing the database queries or otherwise acting as a proxy for the device 720 may conserve battery and network resources that might otherwise be used if the first portable electronic device 720 performed the queries.

Figure 8:
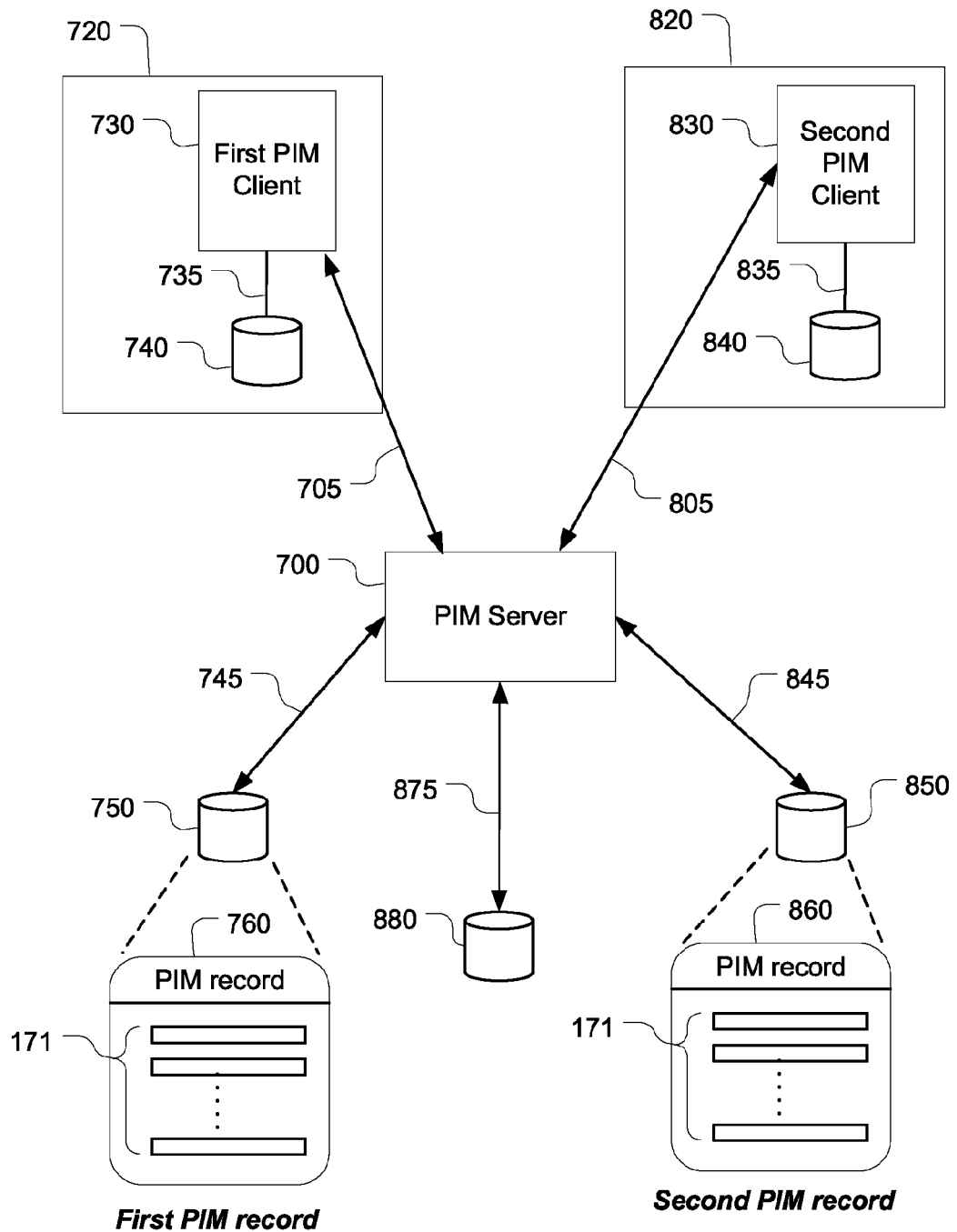
FIG. 8 is a diagram illustrating a system operable to identify PIM records for a plurality of portable electronic devices in accordance with another embodiment of the present disclosure.

FIG. 8 depicts another example embodiment wherein a system is operable to identify PIM records for a plurality of portable electronic devices. Similar to the first portable electronic device 720, FIG. 8 includes a second portable electronic device 820. The second portable electronic device 820 may operate in a similar fashion as the first portable electronic device 720, and may comprise a second PIM client 830, second local database 840 accessed 835 by the second PIM client 830. The second portable electronic device 820 communicates 805 with the PIM server 700 to synchronize PIM records between the second local database 840 and the second remote database 850. Optionally, the PIM server 700 may also have access 875 to additional information 880. The additional information 880 might be location information, mapping information, status information, or any other information which might be accessible 875 by the PIM server 700 in addition to the PIM records.

The PIM server 700 may analyze PIM records for the first portable electronic device 720 and the second portable electronic device 820 to identify predicted trigger conditions. For each predicted trigger condition, the PIM server 700 may obtain identification information associated with the predicted trigger condition. In one embodiment, the PIM server 700 may utilize additional information 880 to determine relationships between the predicted trigger condition and a contact. For each predicted trigger condition, the PIM server 700 may identify PIM records which contain the identification information and that are not associated with the predicted trigger condition. For identified PIM records, the PIM server 700 may present a reminder notification to the portable electronic device associated with each identified PIM record.

As an example, PIM server 700 may have access 745 to calendar PIM records for the user of the first portable electronic device 720 and the PIM server 700 may have access 845 to calendar PIM records for the user of the second portable electronic device 820. In addition to the calendar PIM records, the PIM server 700 also has access 875 to location information stored in a database of additional information 880. The PIM server 700 may identify a predicted trigger condition regarding the second PIM record 860. For example, the predicted trigger condition may be a meeting appointment at a specified date and time and specified meeting location. The PIM server 700 may then obtain identification information by determining a relationship between the second PIM record 860 and various contacts. In this example, the PIM server 700 has access 875 to additional information 880, including location information which lists nearby offices that are near the specified meeting location. The PIM server 700 may then search the PIM records to identify one or more PIM records which contains an overlapping date and time setting as the specified date and time in the second PIM record and which contain either the specified meeting location or one of the nearby offices. As a result of this search, the PIM server 700 is able to predict which users of portable electronic devices will be in a nearby proximity, even if they are in different meetings at different rooms. For example a first user may be in a first meeting in a first room, very near to a second room where a second user is attending a second meeting at an overlapping time during which the first user is in the first meeting. After compiling identification information through these several queries, the PIM server 700 may identify PIM records which contain the identification information and that are not associated with the predicted trigger condition or predicted trigger conditions. After identifying an identified PIM record, the PIM server 700 may present a reminder notification to the portable electronic device associated with the identified PIM record.

In a variation of example used relative to FIGS. 1 and 4, David and John may be a first and second user of portable electronic devices which access the PIM server 700. The PIM server 700 may determine that John is scheduled to be in a meeting in Building 6 on September 26 at 10:00 AM local time. The PIM server 700 may utilize intelligence to determine that John will likely travel to attend the meeting which is in a different building than his office location. At the same date and time, David is scheduled to attend a meeting in a different room in Building 6 for a topic unrelated to John's meeting. During a periodic process, the PIM server 700 compiles the identification information by analyzing a plurality of PIM records. For example, the PIM server 700 may begin with David's calendar PIM record and utilize the location and schedule information to determine a relationship to other contacts which might be in the same location around the same time. For example, the PIM server 700 may identify all the people in Building 6 or people scheduled to attend meetings in Building 6. By utilizing other PIM records and additional information 880 to determine relationships to other contacts, the PIM server 700 may identify that John will be in a nearby location at around the same time as David. Therefore, the PIM server 700 searches for a PIM record in David's PIM records that contains a reference to John and that is not associated with David's scheduled meeting. As a result of the search, the PIM server 700 identifies a task PIM record in which David intends to interact with John the next time they see each other. The PIM server 700 may present a reminder notification to David's portable electronic device indicating that John may be in the vicinity. In response to the reminder notification, David's portable electronic device may enable a proximity detection to verify when it is within proximity to John's portable electronic device. Alternatively, David's portable electronic device may present a reminder to David indicating that David has a task PIM record associated with John and that John may be in the vicinity around the same time. Fortunately, David sees John as they are entering their separate meetings, but because of the opportunity based reminder, David takes advantage of the opportunity to complete the task represented by the task PIM record.

Figure 9:
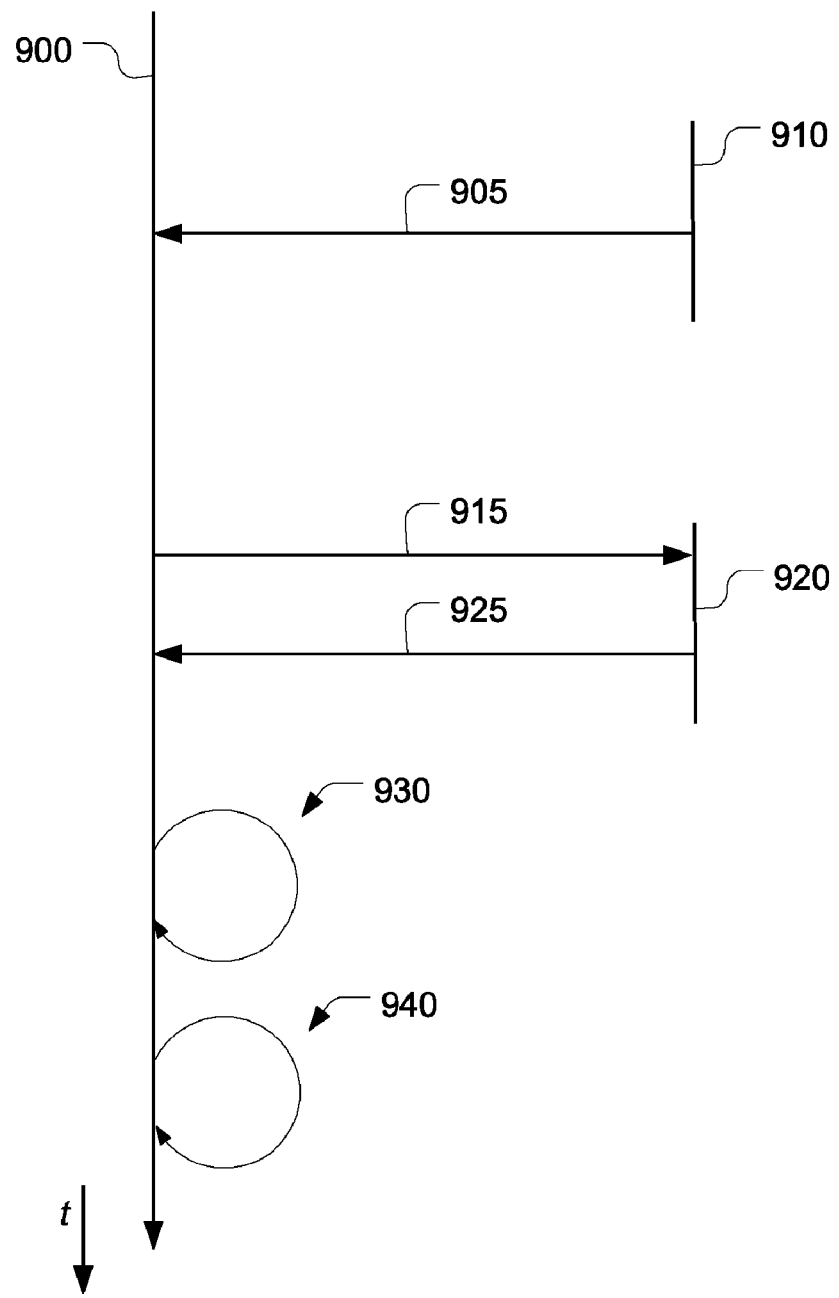
FIG. 9 is a process flow diagram illustrating an example process of associating a trigger condition with a PIM record using a reverse lookup.

FIG. 9 is an example process flow diagram illustrating an implementation of opportunity based reminders in accordance with at least one of embodiments described in the present disclosure. In FIG. 9, a portable electronic device is represented by line 900, with time increasing in the downward direction. At an initial stage of the process, the portable electronic device 900 receives a communication 905 from a contact 910 via a network. For example, communication 905 may be an incoming call, an incoming message, a received broadcast signal or any other communication received from contact 910. In this example, communication 905 is a trigger condition on the portable electronic device 900. The portable electronic device 900, queries (represented by arrow 915) a remote data source 920 to obtain identification information associated with the trigger condition. The portable electronic device 900 receives (represented by arrow 925) identification information from the remote data source 920. The querying 915 and receiving 925 may be, for example, a remote database query. Examples of querying 915 and receiving 925 may include a reverse caller id lookup, a query to a service provider (such as network operator, instant message service provider, social network messaging platform), an Internet search, or any other query and response which yields identification information associated with the incoming communication 905. At process 930, the portable electronic device identifies a PIM record which contains the identification information and that is not associated with the trigger condition. For example, it may identify a task PIM record associated with the contact 910. At process 940, the portable electronic device presents a reminder regarding the identified PIM record.

Further to the previous example (with respect to FIG. 1), the contact 910 may be John calling David's portable electronic device 900. In this example, John may have called from his phone number which is not programmed in David's portable electronic device, so the caller ID included in the incoming communication 905 only includes John's home phone number. David may not be inclined to answer the phone if he does not recognize the caller's phone number. Following the process in FIG. 9, David's portable electronic device queries 915 a public Internet search engine 920 and receives 925 John's name associated with the caller ID. Using this identification information, David's portable electronic device identifies 930 the task PIM record which contains John's name and is not associated with the trigger condition. David's portable electronic device presents a reminder 940 to David regarding the task PIM record, reminding David to talk with John regarding the task, allowing David to answer the incoming communication from John.

Figure 10:
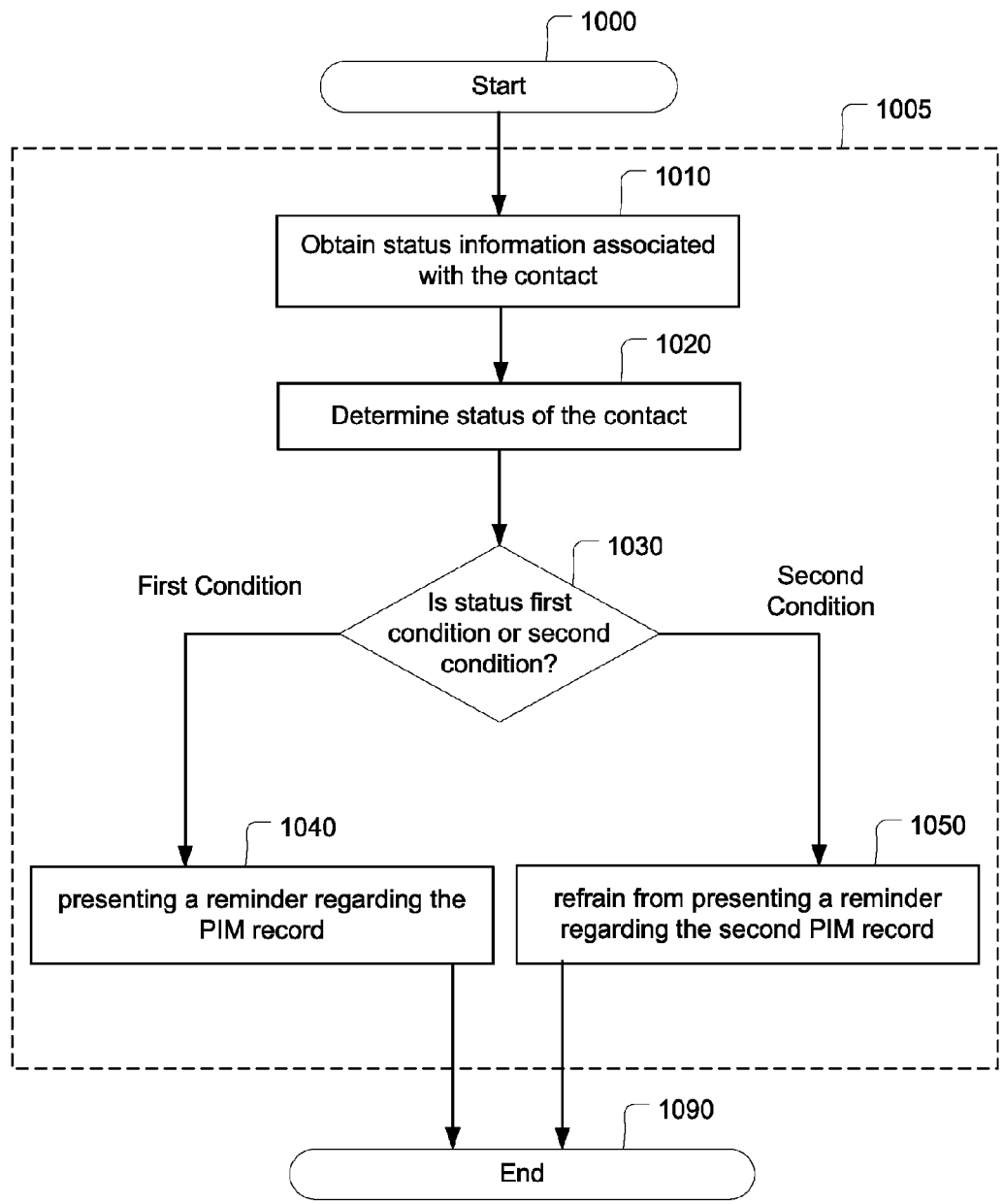
FIG. 10 is a flowchart illustrating a method of presenting a reminder based on a status of a contact in accordance with another embodiment of the present disclosure.

FIG. 10 is a flowchart illustrating a further example method for presentation of opportunity based reminders in accordance with at least one of the embodiments described in the present disclosure. Referring now to FIG. 10, the portable electronic device presents an opportunity based reminder based upon an occurrence of a trigger condition suggesting an opportunity to interact with a contact and further based on a status of the contact. In block 1000, the flowchart of FIG. 10 begins after identifying a PIM record for an opportunity based reminder. For example, this might follow blocks 210 and 230 from FIG. 2, in which there has been an occurrence of a trigger condition (block 210) and identification (block 230) of a PIM record which contains at least a portion of the identification information obtained from the trigger condition. In this situation, the identification information identifies a contact. Alternatively, block 1000 might follow block 310 and 330 from FIG. 3, in which there has been an occurrence of a trigger condition (block 310) and there has been an identifying operation (block 330) to identify a contact associated with both of a first PIM record and the second PIM record.

In block 1005, presentation of a reminder regarding the first PIM record is further based upon the status of the contact. In block 1010, the portable electronic device obtains status information associated with the contact. Status information may comprise proximity information, location information, presence information or availability information associated with the contact. As some examples, status information may be a shared calendar sharing free/busy information, a status message in an instant message application, a profile status setting in a social networking application, a current location retrieved from a location server, a proximity detection indicating a proximal relationship to the portable electronic device, or any information which might be used to determine a status of the contact. In block 1020, the portable electronic device determines the status of the contact. In block 1030, the method checks the status to see if it matches a first condition or a second condition. If the status matches a first condition, then at block 1040, the portable electronic device presents a reminder regarding the PIM record. If the status matches a second condition, then at block 1050, the portable electronic device refrains from presenting the reminder regarding the second PIM record.

Figure 11:
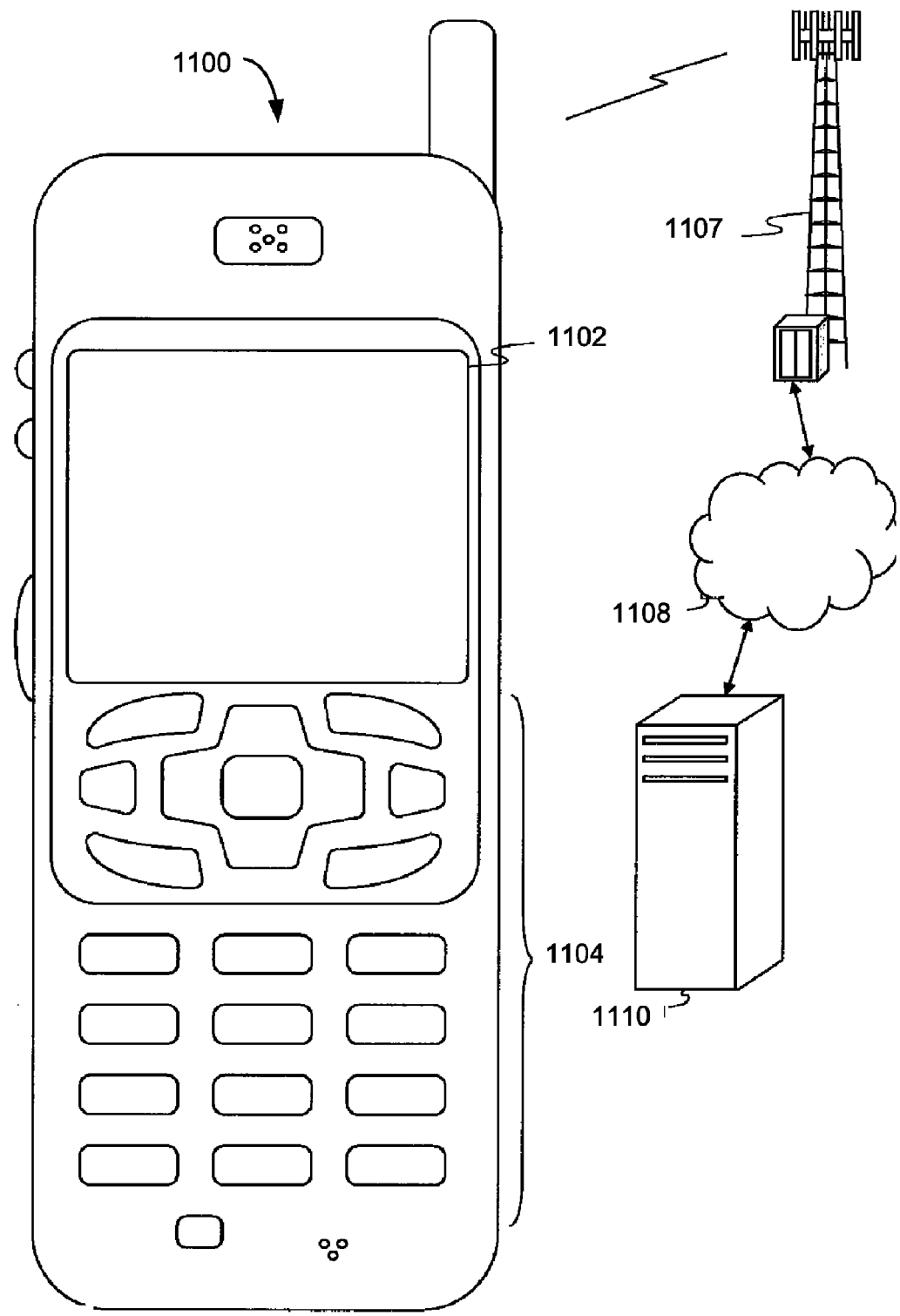
FIG. 11 illustrates a wireless communications system including an embodiment of a portable electronic device in accordance with at least one of the embodiments of the present disclosure.

FIG. 11 illustrates an example wireless communications system including an embodiment of a portable electronic device in accordance with at least one of the embodiments described in the present disclosure. The portable electronic device 1100 is operable for implementing aspects of the disclosure, but the disclosure should not be limited to these implementations. The portable electronic device 1100 may be (or be a part of) a smart phone, wireless router, relay, laptop computer, tablet computer, GPS-enabled device, Navigation System, wireless mobile tracking device or any other device which may transmit information via a wireless network 1107.

The portable electronic device 1100 may include a user interface that includes a display 1102 and a user input 1104. The user input 1104 of portable electronic device 1100 may be or include a touch-sensitive surface, a keyboard or other input keys known in the art. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The portable electronic device 1100 may present options for the user to select, controls for the user to actuate, and/or cursors or other indicators for the user to direct.

The portable electronic device 1100 may further accept data entry from the user, including numbers to dial or various parameter values for configuring the operation of the portable electronic device 1100. The portable electronic device 1100 may further execute one or more software or firmware applications in response to user commands. These applications may configure the portable electronic device 1100 to perform various customized functions in response to user interaction. Additionally, the portable electronic device 1100 may be programmed and/or configured over-the-air, for example from a wireless base station, a wireless access point, or a peer portable electronic device 1100.

Among the various applications executable by the portable electronic device 1100 is, for example, a PIM application for storing, retrieving and otherwise managing PIM records or information. Another application may be a web browser, which enables the display 1102 to show a web page. The web page may be obtained via wireless communications with a wireless network access node, a cell tower, a peer portable electronic device 1100, or any other wireless communication network or system 1100. The network 1107 may be coupled to a wired network 1108, such as the Internet. Via the wireless link and the wired network, the portable electronic device 1100 can have access to information on various servers, such as a server 1110. The server 1110 may provide content that may be shown on the display 1102. Alternately, the portable electronic device 1100 may access the network 1107 through a peer portable electronic device 1100 acting as an intermediary, in a relay type or hop type of connection. A portable electronic device 1100 may be operable to transmit over one or more of any suitable wireless networks 1100 known in the art.

The portable electronic device 1100 and other components described above may include a processing component that is capable of executing instructions related to the actions described above.

Figure 12:
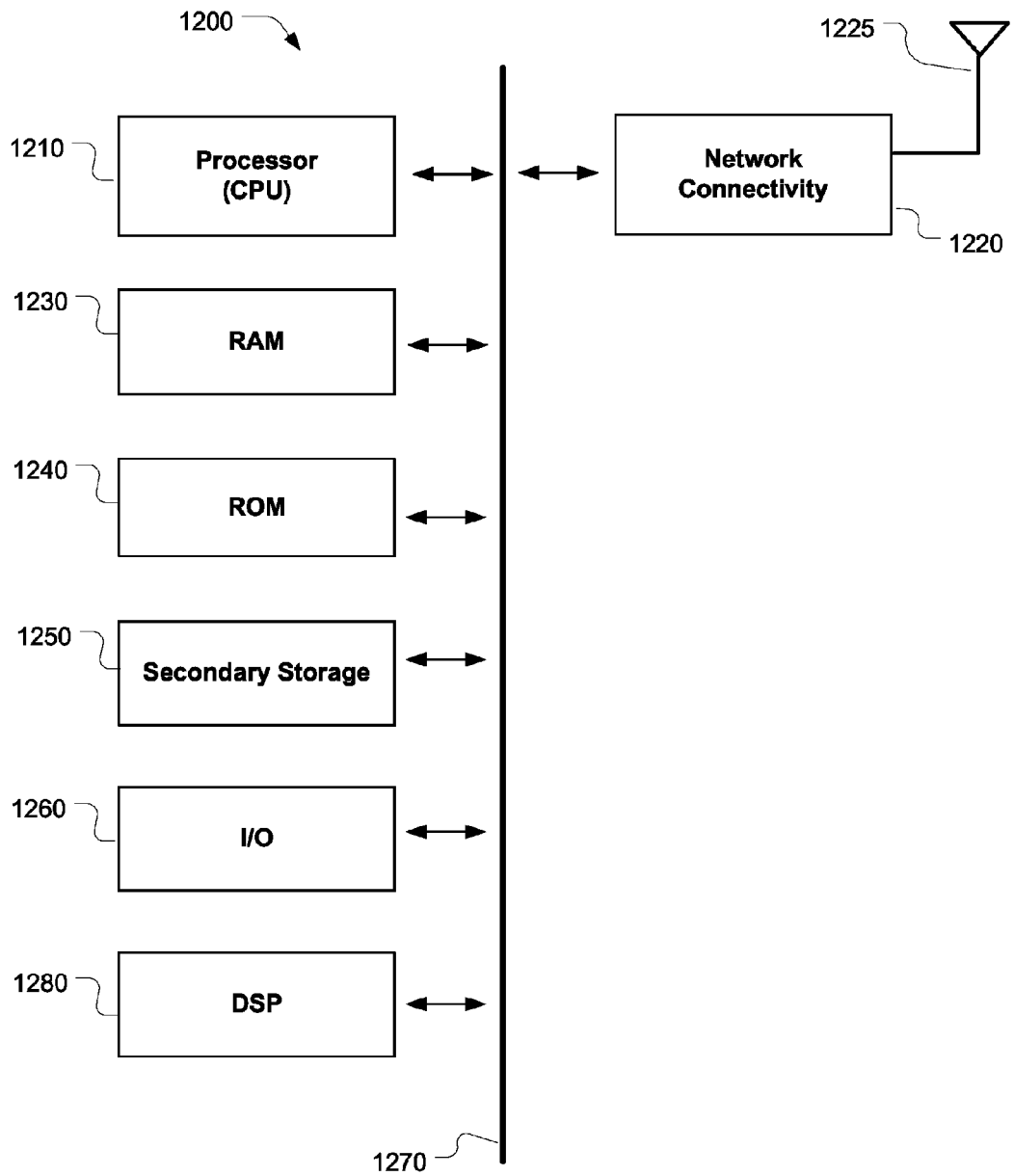
FIG. 12 is a diagram illustrating a processor and related components suitable for implementing at least one of the embodiments described in the present disclosure.

FIG. 12 illustrates an example embodiment of an apparatus 1200 that may be configured to operate as a device (e.g., mobile 1100, server such as 1110 or PIM server 700) which includes a processing component 1210 suitable for implementing one or more of the embodiments earlier described herein. In addition to the processor 1210 (which may be referred to as a central processor unit or CPU), the system 1200 may include network connectivity devices 1220, random access memory (RAM) 1230, read only memory (ROM) 1240, secondary storage 1250, and input/output (I/O) devices 1260. These components may communicate with one another via a bus 1270. In some cases, some of these components may not be present or may be combined in various combinations with one another or with other components not shown. These components may be located in a single physical entity or in more than one physical entity. Any actions described herein as being taken by the processor 1210 might be taken by the processor 1210 alone or by the processor 1210 in conjunction with one or more components shown or not shown in the drawing, such as a digital signal processor (DSP) 1280. Although the DSP 1280, is shown as a separate component, the DSP 1280 may be incorporated into the processor 1210.

The processor 1210 executes instructions, logic, codes, computer programs, or scripts that it may access from the network connectivity devices 1220, RAM 1230, ROM 1240, or secondary storage 1250 (which might include various disk-based systems such as hard disk, floppy disk, or optical disk). In one embodiment, a computer readable medium may store computer readable instructions, which when executed by the processor 1210, cause the processor to perform according to a method described in this disclosure. While only one CPU 1210 is shown, multiple processors may be present. Thus, while instructions may be discussed as being executed by a processor, the instructions may be executed simultaneously, serially, or otherwise by one or multiple processors. The processor 1210 may, for example, be implemented as one or more CPU chips or modules. The processor 1210 may also be integrated with other functions of portable electronic device 1100 in or on a single chip or module.

The network connectivity devices 1220 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1220 may enable the processor 1210 to communicate with the Internet or one or more telecommunications networks or other networks from which the processor 1210 might receive information or to which the processor 1210 might output information. The network connectivity devices 1220 might also include one or more transceiver components 1225 capable of transmitting and/or receiving data wirelessly.

The RAM 1230 might be used to store volatile data and perhaps to store instructions that are executed by the processor 1210. The ROM 1240 is a non-volatile memory device that in some cases has a smaller memory capacity than the memory capacity of the secondary storage 1250. ROM 1240 might be used to store instructions and perhaps data that are read during execution of the instructions. Access to both RAM 1230 and ROM 1240 is typically faster than to secondary storage 1250. The secondary storage 1250 is typically comprised of one or more disk drives or tape drives and might be used for non-volatile storage of data or as an over-flow data storage device if RAM 1230 is not large enough to hold all working data. However, the secondary storage 1250 could be implemented using any appropriate storage technology, including so-called "solid state disk", FLASH, EEPROM, or other generally non-volatile or persistent storage. Secondary storage 1250 may be used to store programs that are loaded into RAM 1230 when such programs are selected for execution.

The I/O devices 1260 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1225 might be considered to be a component of the I/O devices 1260 instead of or in addition to being a component of the network connectivity devices 1220. Some or all of the I/O devices 1260 may be substantially similar to various components depicted in the previously described drawing of the portable electronic device 1100, such as the display 1102 and the input 1104.

The present disclosure provides a method and apparatus for presenting an opportunity-based reminder. For example, a reminder may be presented for a PIM record when there may be an opportunity for personal interaction regarding the PIM record. The opportunity for personal interaction regarding the PIM record may be identified in response to a trigger condition that is not associated with the PIM record. In one embodiment, for a method in a portable electronic device, the method comprises obtaining identification information associated with a trigger condition in the portable electronic device; identifying a Personal Information Management, PIM, record that contains at least a portion of the identification information and that is not associated with the trigger condition; and presenting a reminder regarding the PIM record based on an occurrence of the trigger condition.

In another embodiment, for a method in a portable electronic device having access to Personal Information Management, PIM, entries, the method comprises identifying a contact associated with both of a first PIM record and a second PIM record; and presenting a reminder regarding the first PIM record based on an occurrence of a trigger condition associated with the second PIM record, the trigger condition having no association with the first PIM record.

In one implementation, the method further comprises determining a status of a contact based on status information, status information being one of proximity information, location information, presence information and availability information associated with the contact; presenting the reminder regarding the second PIM record when the status indicates a first condition; and refraining from presenting the reminder when the status indicates a second condition.

The steps, processes, or operations described herein are examples. There may be many variations to these steps or operations without departing from the scope of this disclosure. For instance, where appropriate, the steps may be performed in a differing order, or steps may be added, deleted, or modified.

Although example embodiments of this disclosure have been depicted and described in detail herein, it will be apparent to those skilled in the relevant art that various modifications, additions, substitutions, and the like can be made without departing from the concepts and embodiments disclosed herein, and these are therefore considered to be within the scope of the present subject matter as defined in the following claims.

What is claimed is:

1. A method in a portable electronic device, the method comprising:
    obtaining identification information associated with a trigger condition in the portable electronic device;
    identifying a Personal Information Management, PIM, record that contains at least a portion of the identification information, wherein the PIM record was previously not configured to be associated with the trigger condition prior to an occurrence of the trigger condition; and
    presenting a reminder regarding the PIM record based on the occurrence of the trigger condition.

2. The method of claim 1, wherein the trigger condition is one of a proximity detection, an incoming call, an incoming message, a reminder associated with a second PIM record, and a notification message from a server.

3. The method of claim 1, wherein the identification information identifies a contact.

4. The method of claim 3, wherein presenting a reminder comprises:
    providing a notification indicating an opportunity to communicate with the contact regarding the PIM record.

5. The method of claim 3, wherein presenting a reminder is further based on status information indicating a status of the contact, and the method further comprises:
    determining the status of the contact based on the status information, status information being one of proximity information, location information, presence information and availability information associated with the contact;
    presenting the reminder regarding the second PIM record when the status indicates a first condition; and
    refraining from presenting the reminder when the status indicates a second condition.

6. The method of claim 5, wherein the location information comprises a map and a travel route.

7. The method of claim 3, wherein obtaining identification information comprises:
    determining a relationship between the contact and a second PIM record based on other information.

8. The method of claim 7, wherein the other information comprises a third PIM record accessible by the portable electronic device.

9. The method of claim 1, wherein the trigger condition is a reminder associated with a second PIM record.

10. The method of claim 9, wherein the second PIM record is a calendar item and the trigger condition is a time-based reminder relative to the second PIM record.

11. The method of claim 9, wherein the PIM record is associated with a first topic, the second PIM record is associated with a second topic, and wherein the first topic and second topic are unrelated.

12. A portable electronic device, comprising:
a processor configured to:
obtain identification information associated with a trigger condition in the portable electronic device;
identify a Personal Information Management, PIM, record that contains at least a portion of the identification information, wherein the PIM record was previously not configured to be associated with the trigger condition prior to an occurrence of the trigger condition; and
present a reminder regarding the PIM record based on the occurrence of the trigger condition.

13. The portable electronic device of claim 12, wherein the processor is further configured to:
determine the status of a contact associated with the identification information, based on status information indicating a status of the contact;
present the reminder regarding the second PIM record when the status indicates a first condition; and
refrain from presenting the reminder when the status indicates a second condition.

14. The portable electronic device of claim 12, wherein the trigger condition is one of a proximity detection, an incoming call, an incoming message, a reminder associated with a second PIM record, and a notification message from a server.

15. The portable electronic device of claim 12, wherein the status information is one of proximity information, location information, presence information and availability information associated with the contact.

16. The portable electronic device of claim 12, wherein the trigger condition is a reminder associated with a second PIM record.

17. The portable electronic device of claim 12, wherein the processor during the operation to obtain identification information performs an operation to:
obtain other information from a second PIM record that contains at least a portion of the identification information and that is not associated with the trigger condition and using the other information as identification information.

18. A method in a server with access to a plurality of Personal Information Management, PIM, records, the method comprising:
processing identification information associated with each of the PIM records to identify a first PIM record and a second PIM record that share at least a portion of identification information; and
causing a reminder notification to be presented on a portable electronic device regarding the first PIM record based on an occurrence of a trigger condition associated with the second PIM record, wherein the first PIM record was previously not configured in association with the trigger condition prior to the occurrence of the trigger condition.

19. The method of claim 18, wherein causing comprises communicating a message to the portable electronic device associated with the first PIM record.

20. The method of claim 18, wherein the first PIM record is associated with a first portable electronic device and the second PIM record is associated with a second portable electronic device.

* * * * *